Patented Sept. 5, 1950

2,521,101

UNITED STATES PATENT OFFICE 2,521,101

METHOD OF PREPARING COLORED CASINGS

Clifford J. B. Thor, Western Springs, and Francis W. Tauber and George Edgar Tripp, Chicago, Ill., assignors to The Visking Corporation, Chicago, Ill., a corporation of Virginia No Drawing. Application January 4, 1949, Serial No. 69,232

12 Claims. (Cl. 99—176)

This invention relates to dyed cellulose casings of the type utilized in the preparation of frankfurters without casings. More particularly, it relates to a method of preparing such dyed cellulose sausage casings.

Frankfurters without casings are produced by a method wherein a meat emulsion is stuffed into a cellulose casing, and after linking, the stuffed casing is successively subjected to smoking and cooking operations. Upon completion of the cooking operation, the frankfurters are cooled, the casings stripped or peeled therefrom and the resulting frankfurters (without casings) are packaged. The color of the frankfurter depends on the nature and type of the meat emulsion and the processing conditions, and they thus may vary from batch to batch. A sausage maker desires to produce frankfurters with their outer surfaces of substantially uniform color. In the past, the sausage maker incorporated a water-soluble, non-toxic dye in the cook water employed in the cooking step in the process of preparing the frankfurters. In such procedure, the dye first colored the casing and then migrated therefrom to and colored the surface of the frankfurter.

Cellulose sausage casings used in the preparation of frankfurters without any casings are prepared by extruding a viscose solution through a die having an annular orifice into a coagulating and regenerating bath. The regenerated cellulose tubing, in an operation coordinated with the extrusion step, is in a continuous manner successively washed, impregnated with a softening agent, such as glycerine, and finally dried.

Attempts have been made to produce cellulose sausage casings dyed with a dye which in the process of preparing the frankfurter, and particularly the cooking step, will be applied to the surface of the frankfurter. When the step of dyeing was interposed before the impregnation of the tubing with glycerine, the dye was leached from the casing. When the dye was applied in an operation subsequent to the incorporation of the glycerine, a quantity of the glycerine was leached from the tubing with the result that the final tubing did not have the requisite amount of glycerine. When the dye was incorporated in the glycerine bath, non-uniformly colored casings frequently were obtained and a sludge was produced which interfered with the dyeing.

An object of this invention is to provide a method of producing cellulose sausage casings that are substantially uniformly over-all colored.

Another object of this invention is to provide a method of producing over-all dyed sausage casing that is continuous and coordinated with the process of producing the casing.

An additional object of this invention is to provide a simple and easy to operate method of producing over-all dyed cellulose sausage casing.

Other and additional objects of this invention will become apparent hereinafter.

The objects of the invention are accomplished, in general, by extruding a viscose solution through a die having an annular orifice into a coagulating and regenerating bath, and after washing the regenerated cellulose tubing and while it is in the gel state, passing it through an aqueous bath containing glycerine and the dye, said bath being maintained at a pH of from about 7.5 to 9.5 and then drying the casing.

In one embodiment of the invention, the gel regenerated cellulose tubing is passed through a single aqueous bath of glycerine and the dye, the concentration of the components of the bath, the bath travel and rate of travel being such that upon leaving the bath, the tubing will be impregnated with the required amounts of both glycerine and dye. In such embodiment, when it is desired to utilize the apparatus for the production of uncolored regenerated cellulose casing, it is necessary to interrupt the operation and thoroughly cleanse the vat containing the glycerine and dye. This results in a loss of production, and in order to avoid it, the invention, in another embodiment, contemplates positioning a movable vat containing glycerine and the dye between the usual glycerine bath and the dryer. With such an arrangement, the regenerated cellulose tubing is passed first through a glycerine bath and thence through the bath containing glycerine and the dye, the bath travel and the rate of travel of the tubing in each of the baths being such that upon exit from the glycerine-dye bath the tubing will be impregnated with the requisite amounts of both the glycerine and the dye, and substantially no glycerine will be extracted from the tubing in the second bath. When uncolored tubing is desired, the movable vat is removed without interruption of production.

The dye employed in the process can be any non-toxic, certified water-soluble food color of any desired color. The following are illustrative dyes which can be used to produce colored casings which during the processing of sausage therein will impart the desired color to the surface of the sausage:

F. D. & C. Red No. 1 (Color Index 80)
F. D. & C. Red No. 2 (Color Index 184)
F. D. & C. Red No. 4 (Formerly named Ponceau SX)
F. D. & C. Orange No. 1 (Color Index 150)
F. D. & C. Yellow No. 1 (Color Index 10)
F. D. & C. Yellow No. 2 (Color Index 10)
F. D. & C. Yellow No. 5 (Color Index 640)

F. D. & C. Yellow No. 6 (Formerly named Sunset Yellow FCF)
Cochineal
Annato

Instead of using one of the dyes, mixtures of two or more of the dyes can be used.

The colors of the above-mentioned dyes are sensitive to changes in pH. For example, the color of F. D. & C. Orange No. 1 in alkaline environment or solution (pH 7.5 to 10) is orange red, while at a pH of from 7 to 6 the color is red, while at a pH of from 6 to 2 the color is red and is accompanied by decreased solubility resulting in the formation of sludge. Additionally, when the dye bath is contained or utilized in a receptacle formed of stainless steel and the dye is in acid environment, the container will be corroded and result in an increased amount of sludge which interferes with the proper dyeing of the casings. In order to produce a uniformly colored casing and to inhibit corrosion of the vat containing the dye, the dye bath is maintained at a pH in excess of 7.5 and preferably at a pH of 8 to 9.5 by buffering the dye bath with an appropriate base.

Any non-toxic base which does not deleteriously affect the components of the dye bath and the casing after drying can be used as the buffer for the dye bath. When no foreign substances are to be incorporated in the final cellulose sausage casings, the dye bath is buffered with a volatile base, such as, ammonium hydroxide, ammonium carbonate, ammonium bicarbonate, etc., which is volatilized and dissipated from the casing during drying.

The drying of the dyed casing can be accomplished in any suitable manner. Use of the apparatus and method disclosed in United States Patent No. 1,967,773 has given satisfactory results. When an ammonium compound is utilized as the buffer for the dye bath, the temperature of drying is such as to volatilize the ammonia from the casing.

When the process is carried on for an appreciable length of time, micro-organisms tend to develop in the dye-glycerine bath. To inhibit such development, the dye-glycerine bath is at repeated intervals heated to a temperature of 60° C. Preferably, the dye-glycerine bath is maintained at 60° C. throughout the process.

The steps of extruding, regenerating, washing, softening, dyeing and drying are coordinated so that such steps are performed successively to provide a continuous method.

The manner and specific detail of practicing the invention will become more apparent from the following examples, it being understood that such examples are merely illustrative embodiments of the process and are not intended to be limitative thereof, and the proportions are by weight.

Example 1.—Orange colored casings

A viscose solution of the type employed in the production of cellulose sausage casings was continuously extruded through a nozzle having an annular orifice of a size to produce a 27/32 inch diameter casing having a wall thickness of .0010 inch into a coagulating and regenerating bath of the well-known type such as, for example, that set forth in United States Patent No. 2,043,173. The regenerated cellulose tubing was then passed through a series of water baths wherein it was thoroughly washed substantially free of impurities (sulfur, acid, salts, etc.) and thereafter passed through a bath consisting of 11.5% glycerine and 88.5% water. Upon leaving the glycerine bath, the casing was passed through a dye bath at a temperature of 60° C. and consisting of approximately 1.75% to 2% F. D. & C. Orange No. 1 incorporated in an aqueous bath formed of 11.5% glycerine and 88.5% water, and such amount of ammonium hydroxide as to impart a pH of from 7.5 to 9 to said bath. The resulting casing was then dried by the method disclosed in United States Patent No. 1,967,773.

The pH of the glycerine dye bath was maintained within the desired limits during operation of the process by additions of the requisite amounts of ammonium hydroxide.

The tubing traveled at the rate of 62.8 feet per minute and was given a bath travel of 178 inches in the glycerine bath, and a bath travel of 36 inches in the glycerine-dye bath.

The steps were so coordinated that the entire process was carried out in a continuous manner.

Example 2.—Cherry colored casing

Same as Example 1, except that approximately 3% to 3.25% of F. D. & C. Orange No. 1 is incorporated into the aqueous bath formed of 11.5% glycerine and 88.5% water and the tubing is given a bath travel of 80 inches in the glycerine-dye bath.

As is apparent from the preferred example, the preferred embodiment of the invention contemplates the production of the cellulose tubing from viscose. It is, however, to be understood that the invention is not restricted thereto. In general, the regenerated cellulose tubing may be produced by coagulating and/or regenerating an aqueous cellulosic dispersion as is well known in the art. Thus, the invention comprehends the production of regenerated cellulose tubing as may be obtained from the viscose or cuprammonium processes and lowly esterified or lowly etherified cellulose derivatives where there is only one ether or ester group associated with several cellulose units and other cellulosic materials of similar nature.

Instead of glycerine constituting the softening agent, a mixture of glycerine and a water-soluble amide of the type and nature disclosed in United States Patent No. 2,074,336 can be used. Other softeners for regenerated cellulose, such as, ethylene glycol, propylene glycol, diethylene glycol, and formamide, alone or in admixture with an amide of the type previously referred to may also be used, but the results obtained therewith are somewhat inferior to those obtained when glycerine, alone or in admixture with any of the previously named softeners, constitutes the softening agent.

The color of the dyed casing depends on the nature and amount of dye incorporated therein. The quantity of dye incorporated in the tubing depends on the concentration of the dye in the dye bath and the time the casing is subjected to such bath. By correlating the concentration of the dye and the time the tubing is subjected to the dye bath, colors of various intensities and hues can be obtained.

The dye vats are made of stainless steel and are equipped with stainless steel fittings. In order to maintain the composition of the bath uniform it is circulated by stainless steel pumps. By mounting on skids the dye vats are portable and can be positioned in place or removed, when uncolored casings are desired, or moved from machine to machine as required.

Casings produced by this method are substantially uniform in color. When employed in the process of producing frankfurters without casings, the dye of the casing migrates from the casing onto the meat surface of the frankfurter, and when the casing is peeled, there results a frankfurter having a substantially uniform surface color.

Since it is obvious that various changes and modifications may be made in the above description without departing from the nature and spirit thereof, it is to be understood that the invention is not to be limited thereto except as set forth in the appended claims.

We claim:

1. A method of producing regenerated cellulose sausage casings impregnated with a dye adapted to transfer to and color the surface of the foodstuff encased therein, the steps which comprise passing regenerated cellulose tubing in the gel state through an aqueous bath containing a softener for regenerated cellulose and a non-toxic, water-soluble food dye, maintaining said bath at a pH of 7.5 to 9.5 by additions of a volatile ammonium compound, and drying the tubing at a temperature at which ammonia is volatilized from the tubing, the concentration of the components of the dye bath and the rate of travel and the bath travel of the tubing being correlated to produce the desired color.

2. A method as set forth in claim 1 characterized in that the ammonium compound is ammonium hydroxide.

3. A method as set forth in claim 1 characterized in that the dye is F. D. & C. Orange No. 1.

4. A method of producing regenerated cellulose sausage casings impregnated with a dye adapted to transfer to and color the surface of the foodstuff encased therein, the steps which comprise passing regenerated cellulose tubing in the gel state through an aqueous bath containing glycerine and a non-toxic, water-soluble food dye, maintaining said bath at a pH of 7.5 to 9.5 by additions of a volatile ammonium compound and drying the tubing at a temperature at which ammonia is volatilized from the tubing, the concentration of the components of the dye bath, the rate of travel and the bath travel being correlated to produce the desired color.

5. A method as set forth in claim 4 characterized in that the dye bath is maintained at 60° C.

6. A method as set forth in claim 4 characterized in that the ammonium compound is ammonium hydroxide.

7. A method as set forth in claim 4 characterized in that the dye is F. D. & C. Orange No. 1.

8. A method of producing regenerated cellulose sausage casings impregnated with a dye adapted to transfer to and color the surface of the foodstuff encased therein, the steps which comprise passing regenerated cellulose tubing in the gel state through an aqueous glycerine bath and then through an aqueous bath containing glycerine and a water-soluble, non-toxic food dye, maintaining the dye bath at a pH of 7.5 to 9.5 by additions of a volatile ammonium compound and drying the tubing at a temperature at which ammonia is volatilized from the tubing, the concentrations of the glycerine and glycerine-dye baths, the rate of travel and the bath travel of the tubing in said baths being correlated to produce a tubing of the desired color and flexibility.

9. A method as set forth in claim 8 characterized in that the dye bath is maintained at 60° C.

10. A method as set forth in claim 8 characterized in that the volatile ammonium compound is ammonium hydroxide.

11. A method as set forth in claim 8 characterized in that the dye is F. D. & C. Orange No. 1.

12. A method of producing regenerated cellulose sausage casings impregnated with a dye adapted to transfer to and color the surface of the foodstuff encased therein, the steps which comprise passing regenerated cellulose tubing in the gel state through an aqueous glycerine bath and then through an aqueous bath at 60° F. and containing glycerine and F. D. & C. Orange No. 1, maintaining the dye bath at a pH of 7.5 to 9.5 by additions of ammonium hydroxide and drying the tubing at a temperature at which ammonia is volatilized from the tubing, the concentrations of the glycerine and glycerine-dye baths, the rate of travel and the bath travel of the tubing in said baths being correlated to produce a tubing of the desired color and flexibility.

CLIFFORD J. B. THOR.
FRANCIS W. TAUBER.
GEORGE EDGAR TRIPP.

REFERENCES CITED

The following references are of record in the file of this patent:

UNITED STATES PATENTS

| Number | Name | Date |
|---|---|---|
| 1,903,622 | Henderson | Apr. 11, 1933 |
| 1,959,980 | Henderson | May 22, 1934 |
| 2,477,767 | Remer | Aug. 2, 1949 |